(12) United States Patent
Sun et al.

(10) Patent No.: US 8,635,861 B2
(45) Date of Patent: Jan. 28, 2014

(54) EXHAUST AFTERTREATMENT SYSTEM

(75) Inventors: Jinhui Sun, Dunlap, IL (US); Yung T. Bui, Peoria, IL (US); Michael P. Boahene, Dunlap, IL (US); Shashank Mupparapu, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 369 days.

(21) Appl. No.: 12/881,261

(22) Filed: Sep. 14, 2010

(65) Prior Publication Data

US 2011/0146236 A1 Jun. 23, 2011

Related U.S. Application Data

(60) Provisional application No. 61/289,434, filed on Dec. 23, 2009.

(51) Int. Cl.
*F01N 3/10* (2006.01)

(52) U.S. Cl.
USPC ............ 60/299; 60/272; 60/301; 60/303; 60/300; 60/324

(58) Field of Classification Search
USPC .......... 60/272, 274, 299, 301, 302, 312, 313, 60/322, 323, 324
See application file for complete search history.

(56) References Cited

U.S. PATENT DOCUMENTS

| | | | | |
|---|---|---|---|---|
| 5,144,800 A * | 9/1992 | Shioya et al. | ............ | 60/323 |
| 5,239,826 A * | 8/1993 | Hirota et al. | ............ | 60/302 |
| 5,325,666 A * | 7/1994 | Rutschmann | ............ | 60/302 |
| 5,593,471 A * | 1/1997 | Hori et al. | ............ | 55/302 |
| 5,604,980 A | 2/1997 | Shustorovich et al. | | |
| 5,881,553 A * | 3/1999 | Steenackers et al. | ............ | 60/299 |
| 6,122,910 A * | 9/2000 | Hoshi et al. | ............ | 60/297 |
| 6,557,341 B2 | 5/2003 | Bubeck et al. | | |
| 6,620,391 B2 | 9/2003 | Muller et al. | | |
| 6,647,710 B2 * | 11/2003 | Nishiyama et al. | ............ | 60/286 |
| 6,729,127 B2 | 5/2004 | Woerner et al. | | |
| 7,234,295 B2 * | 6/2007 | Goodfellow | ............ | 60/288 |
| 7,293,408 B2 | 11/2007 | Kohler et al. | | |
| 7,426,980 B2 * | 9/2008 | Bassani | ............ | 181/238 |
| 2006/0153748 A1 | 7/2006 | Huthwohl et al. | | |
| 2006/0153761 A1 | 7/2006 | Bandl-Konrad et al. | | |
| 2008/0314033 A1 | 12/2008 | Aneja et al. | | |

FOREIGN PATENT DOCUMENTS

JP 9088569 3/1997

OTHER PUBLICATIONS

Mike Bogdanoff, Three Locomotive Demonstration Projects, CARB Locomotive Symposium, Nov. 28, 2007, 15 pages, South Coast Air Quality Management District, United States.
MotivePower/Wabtec DOC Module, Presentation, 1 page.
Steve Fritz, U.S. Locomotive Aftertreatment Retrofit Progress Report: SwRI Test Programs, CARB Locomotive Symposium, Nov. 28, 2007, 96 pages, Southwest Research Institute, United States.

(Continued)

*Primary Examiner* — Binh Q Tran
(74) *Attorney, Agent, or Firm* — Miller, Matthias & Hull

(57) ABSTRACT

An exhaust aftertreatment system including an exhaust flow area, a first bank of one or more exhaust treatment devices in fluid communication with the exhaust flow area and a second bank of one or more exhaust treatment devices in fluid communication with the exhaust flow area. The first bank may be arranged in parallel with the second bank and inlet of the first bank is configured to provide greater flow resistance to the exhaust than the inlet of the second bank.

17 Claims, 7 Drawing Sheets

(56) References Cited

OTHER PUBLICATIONS

Mike Iden, From Idea to Market: Technological Successes & Limitations, CARB Locomotive Symposium, Nov. 28, 2007, 2 pages, Union Pacific Railroad Company, United States.

Soot Particle Filter Systems, Brochure from Hug Engineering, 4 pages, Mobiclean, Switzerland.

Harold Holmes, California's Locomotive Emission Reduction Needs, CARB Locomotive Symposium, Nov. 28, 2007, Presentation Excerpt, 1 page, California EPA, United States.

Diesel Particulate Filter (DPF) Technology for Locomotives in the US and Europe, Joint Report for CARB Locomotive Symposium, Nov. 28, 2007, 17 pages, Sacramento, California, United States.

Business Wire, Detroit Diesel Previews its BlueTec (R) SCR Technology at TMC, Detroit Diesel Emissions Control Box, Industry Report, Feb. 9, 2009, 3 pages, Orlando, Florida, United States.

* cited by examiner

EXHAUST AFTERTREATMENT SYSTEM

RELATED APPLICATIONS

This application is based upon and claims the benefit of priority from U.S. Provisional Application No. 61/289,434 by Yung T. Bui et al., filed Dec. 23, 2009, the contents of which are expressly incorporated herein by reference.

TECHNICAL FIELD

The present disclosure relates to exhaust aftertreatment systems for removing or reducing undesirable emissions from the exhaust of fossil fuel powered systems.

BACKGROUND

Exhaust aftertreatment systems are used to remove undesirable emissions from the exhaust of fossil fuel powered systems (e.g. diesel engine, gas engines, gas turbines), which may be used to drive, for example, generators, commercial vehicles, machines, ships, and locomotives. Exhaust aftertreatment systems may include a variety of emissions treatment technology, such as diesel oxidation catalysts (DOCs), diesel particulate filters (DPFs), selective catalytic reduction catalysts (SCRs), lean NOx traps (LNTs) or other devices used to treat the exhaust.

Selective Catalytic Reduction (SCR) systems provide a method for removing nitrogen oxide (NOx) emissions from fossil fuel powered systems. During SCR, a catalyst facilitates a reaction between a reductant, such as ammonia, and NOx to produce water and nitrogen gas, thereby removing NOx from the exhaust gas. Generally, the reductant is mixed with the exhaust upstream of the SCR catalyst.

SCR may be more effective when a ratio of NO to $NO_2$ in the exhaust supplied to the SCR catalyst is about 50:50. Some engines, however, may produce a flow of exhaust having a NO to $NO_2$ ratio of approximately 95:5. In order to increase the relative amount of $NO_2$ to achieve a NO to $NO_2$ ratio of closer 50:50, a diesel oxidation catalyst (DOC) may be located upstream of the SCR catalyst to convert NO to $NO_2$. DOCs are also used to remove carbon monoxide and hydrocarbons from the exhaust.

Exhaust aftertreatment systems may be installed as original equipment or may be retrofitted to a specific application. To facilitate easier installation, some exhaust aftertreatment systems are preassembled with components enclosed within a common housing. U.S. Published Patent Application No. 2008/0314033, by Aneja et al. (hereinafter the '033 application), discloses such a system. The '748 application discloses a generally cubical common housing that encloses a pair of DOC/DPFs, a reducing agent injector, a mixing chamber, and a pair of SCR catalysts. Exhaust entering the system is split into two flow streams that are directed through the two DOC/DPFs in parallel. The exhaust is recombined into a single stream to which the reducing agent is injected and is split again into two streams that flow through the two SCR catalysts in parallel.

While the system disclosed in the '033 application may be suitable to reduce target emissions in some applications, specific size and backpressure constraints, specific emissions requirements and other requirements may make it unsuitable for other applications.

SUMMARY

In one aspect, the present disclosure provides an aftertreatment system for treating exhaust from an engine. The system including an exhaust flow area, a first bank of one or more exhaust treatment devices in fluid communication with the exhaust flow area and a second bank of one or more exhaust treatment devices in fluid communication with the exhaust flow area. The first bank may be arranged in parallel with the second bank and inlet of the first bank is configured to provide greater flow resistance to the exhaust than the inlet of the second bank In another aspect, the present disclosure provides a method for treating the exhaust of an engine. The method includes directing the exhaust stream into an exhaust flow region in fluid communication with a first bank of one or more exhaust treatment device and in fluid communication a second bank of one or more exhaust treatment devices and resisting the flow of exhaust into the first bank of one or more exhaust treatment devices more than resisting the flow of exhaust into the a second bank of one or more exhaust treatment devices.

Other features and aspects of this disclosure will be apparent from the following description and the accompanying drawings.

BRIEF DESCRIPTION OF THE DRAWINGS

In the accompanying drawings, which are incorporated in and constitute a part of this specification, exemplary embodiments of the disclosure are illustrated, which, together with the written description, serve to explain the principles of the disclosed system.

DETAILED DESCRIPTION

Figure 1:
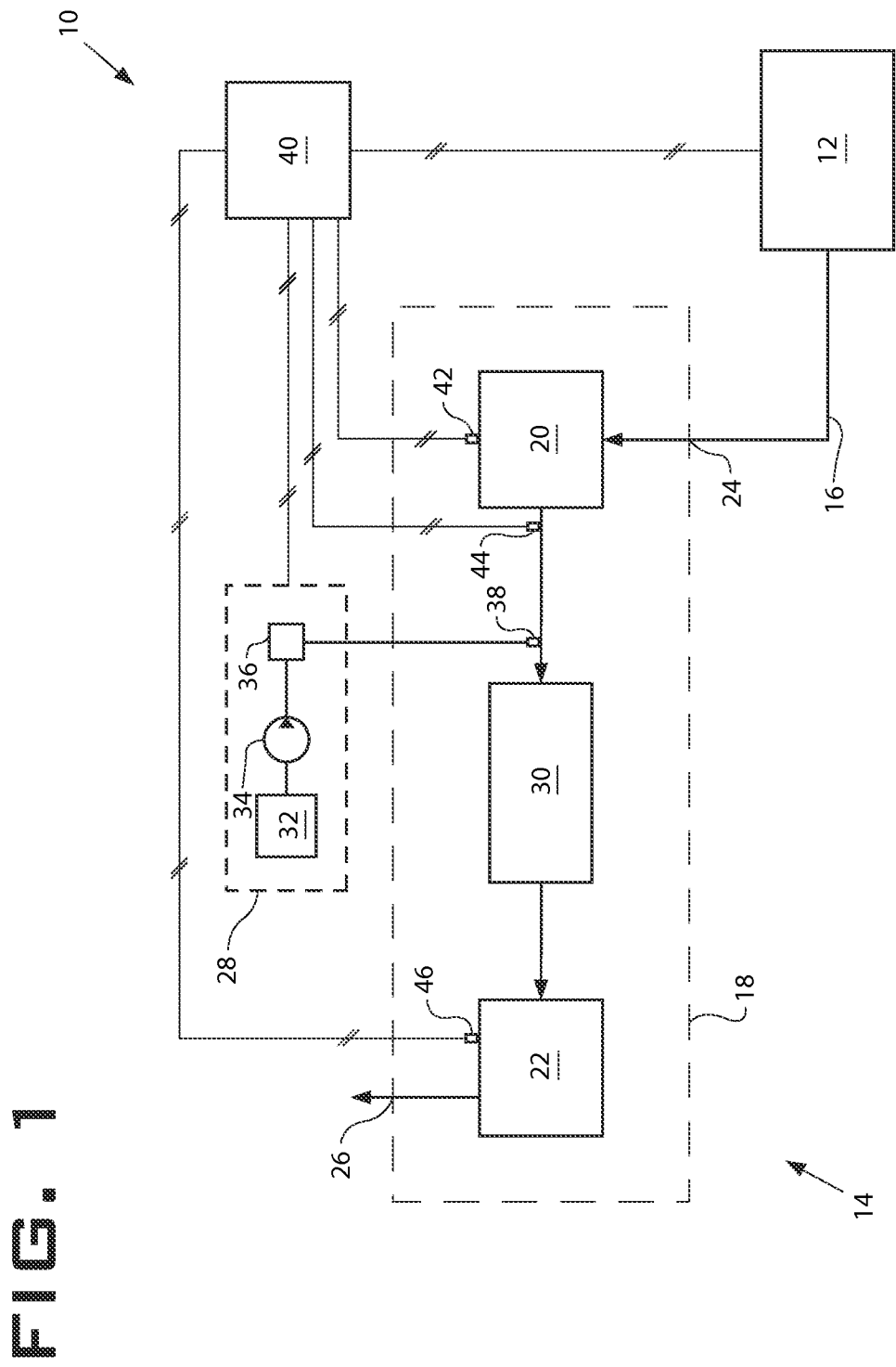
FIG. 1 is a schematic view of a first embodiment of a power system according to the present disclosure.

Referring to FIG. 1, an embodiment of a power system 10 is disclosed. The power system 10 includes an engine 12 and an exhaust aftertreatment system 14 configured to treat one or more exhaust stream(s) 16 produced by the engine 12. The engine 12 may include features not shown, such as fuel systems, air systems, cooling systems, peripheries, drivetrain components, turbochargers, etc. The engine 12 may be any type of engine (internal combustion, turbine, gas, diesel, gaseous fuel, natural gas, propane, etc.), may be of any size, with any number of cylinders, and in any configuration ("V," in-line, radial, etc.). The engine 12 may be used to power any machine or other device, including locomotive applications, on-highway trucks or vehicles, off-highway trucks or machines, earth moving equipment, generators, aerospace applications, marine applications, pumps, stationary equipment, or other engine powered applications.

The exhaust aftertreatment system 14 includes a housing 18 configured to entirely or partially enclose one or more exhaust aftertreatment devices designed to reduce undesirable emissions from the exhaust stream(s) 16 of the engine 12. The exhaust aftertreatment devices may include a variety of emissions treatment technology, including, but not limited to, regeneration devices, heat sources, oxidation catalysts, diesel oxidation catalysts (DOCs), diesel particulate filters (DPFs), selective catalytic reduction catalysts (SCRs), lean NOx traps (LNTs), mufflers, or other devices needed to treat the exhaust stream 16 exiting the engine 12.

In the depicted embodiment, the exhaust aftertreatment system 14 includes one or more first aftertreatment device(s) 20 and one or more second aftertreatment device(s) 22. In one embodiment, the one or more first aftertreatment device(s) 20 are one or more DOC(s) and the one or more second aftertreatment device(s) are one or more SCR catalyst(s). In the depicted embodiment, the exhaust stream 16 enters the housing 18 at one or more exhaust inlet(s) 24, passes through the one or more first aftertreatment device(s) 20 (in series or in parallel), then passes through the one or more second aftertreatment device (s) 22 (in series or in parallel), and exits the housing 18 via one or more exhaust outlet(s) 26.

The exhaust aftertreatment system 14 also includes a reductant supply system 28 and an intermediate flow region 30. The reductant supply system 28 is configured to introduce a reductant into the exhaust stream(s) 16. The reductant supply system 28 may be configured in a variety of ways. Any system capable of supplying a desired amount of reductant on-demand to the exhaust stream 16 may be used. For example, the reductant supply system 28 includes a reductant source 32, a pump 34, a valve 36, and an injector 38 in fluid communication with the reductant source 32. The reductant source 32 may be a tank, vessel, absorbing material, or other device capable of storing and releasing the reductant. The reductant may be urea, ammonia, diesel fuel, or some other hydrocarbon used by the one or more second aftertreatment device(s) 22 to reduce or otherwise remove NOx or NO emissions from the exhaust stream 16. If the reductant used in the system is the same as the fuel used to power the engine 12, then the reductant source 32 may be a fuel tank of power system 10.

The pump 34 may be any an extraction device capable of pulling reductant from the reductant source 32. The valve 36 is included to help regulate or control the delivery of reductant. The injector 38 may be any device capable of introducing reductant in the exhaust stream 16.

The intermediate flow region 30 is configured to mix the reductant with the exhaust stream 16 prior to introducing the mixture into the one or more second aftertreatment device(s) 22. The intermediate flow region 30 may include structures that enhance disruption of the flow stream and/or provide adequate time for the exhaust and reductant to sufficiently mix.

The power system 10 may also include one or more controllers 40 configured to control and monitor the operation of the engine 12 and the exhaust aftertreatment system 14. The power system 10 may have a single controller that controls and monitors both the engine 12 and the exhaust aftertreatment system 14, or multiple controllers that control and monitor various portions of the power system 10. For example, the power system 10 may have a first controller that is in communication with the engine 12 to control and monitor the operation of the engine and may have a second controller that is in communication with the reductant supply system 28 to control the pump 34 and valve 36 and monitor the various aspects of the reductant supply system, such as for example, the amount of reductant available from the reductant source 32. The first and second controllers may also be in communication with each other.

The one or more controllers 40 may be in communication with various sensors associated with the exhaust aftertreatment system 14 to receive signals from the sensors indicative of characteristics of the exhaust and/or exhaust aftertreatment system 14. The sensors may be positioned at any suitable location within the exhaust aftertreatment system 14 to monitor desired characteristics of the exhaust and/or exhaust aftertreatment system. In the depicted embodiment, one or more pressure sensors 42 are associated with the one or more first aftertreatment device(s) 20 to monitor the change in exhaust pressure across the device(s). In addition, a NOx sensor 44 is positioned downstream of the one or more first aftertreatment device(s) 20 to provide a signal indicative of the NOx content of the exhaust. Furthermore, one or more sensors 46 may be associated with the one or more second aftertreatment device(s) 20 to provide signals indicative of the temperature of the exhaust entering or exiting the one or more second aftertreatment device(s) and the NOx content of the exhaust exiting the one or more second aftertreatment device(s).

Figure 2:
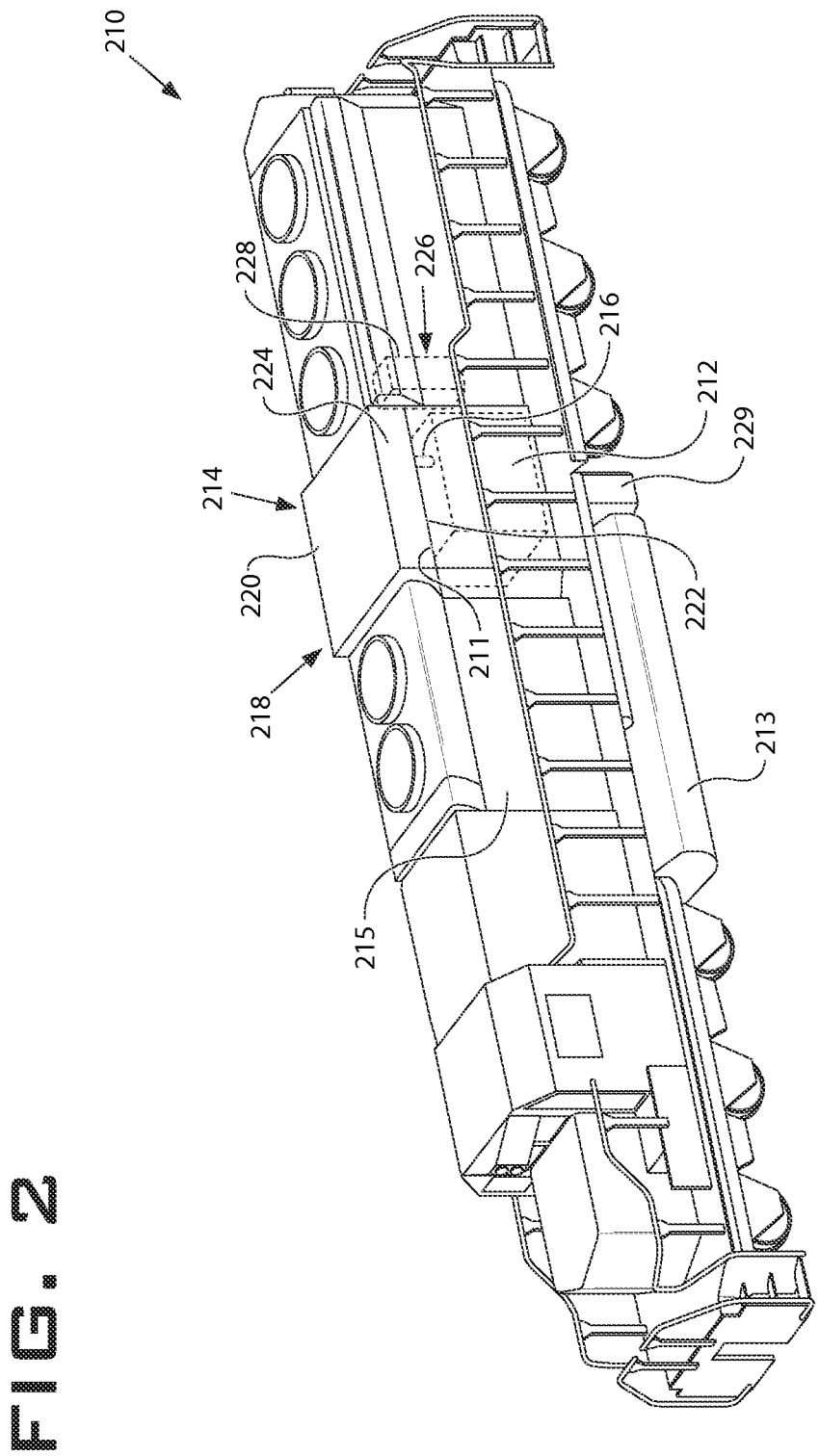
FIG. 2 is a perspective view of second embodiment of a power system according to the present disclosure.

Referring to FIG. 2, a second embodiment of a power system 210 is disclosed. The depicted power system 210 is embodied as a locomotive having an engine 212, a fuel tank 213, and an exhaust aftertreatment system 214. The engine 212 is at least partially enclosed within a body 215 of the locomotive and the exhaust aftertreatment system 214 is externally mounted on the top of the body 215 (such as on a roof 211 of the locomotive body). In other embodiments, however, the exhaust aftertreatment system 214 may be at least partially mounted within the body 215. One or more exhaust conduit(s) 216 connect the engine 212 to the exhaust aftertreatment system 214 to route one or more exhaust stream(s) 217 (see FIGS. 3 and 5) from the engine 212 to the exhaust aftertreatment system 214.

The exhaust aftertreatment system 214 includes various emissions treatment devices to reduce undesirable emissions from the exhaust stream(s) 217 of the engine 212. The emissions treatment devices may include a variety of emissions treatment technology, including, but not limited to, regeneration devices, heat sources, oxidation catalysts, diesel oxidation catalysts (DOCs), diesel particulate filters (DPFs), selective catalytic reduction catalysts (SCRs), lean NOx traps (LNTs), mufflers, or other devices capable of treating the exhaust from a power system. The exhaust aftertreatment system 214 includes a housing 218 that entirely or at least partially encloses the emissions treatment devices. The housing 218 includes a top wall 220, a bottom wall 222, and one or more side walls 224.

The exhaust aftertreatment system 214 also includes a reductant supply system 226. The reductant supply system 226 includes a dosing assembly 228 and a reductant source 229 in fluid communication with the dosing assembly 228. The dosing assembly 228 may include various components (not shown) (e.g. such as pumps, valves, injectors, etc.) operable to supply a desired amount of reductant to the system on-demand.

Figure 3:
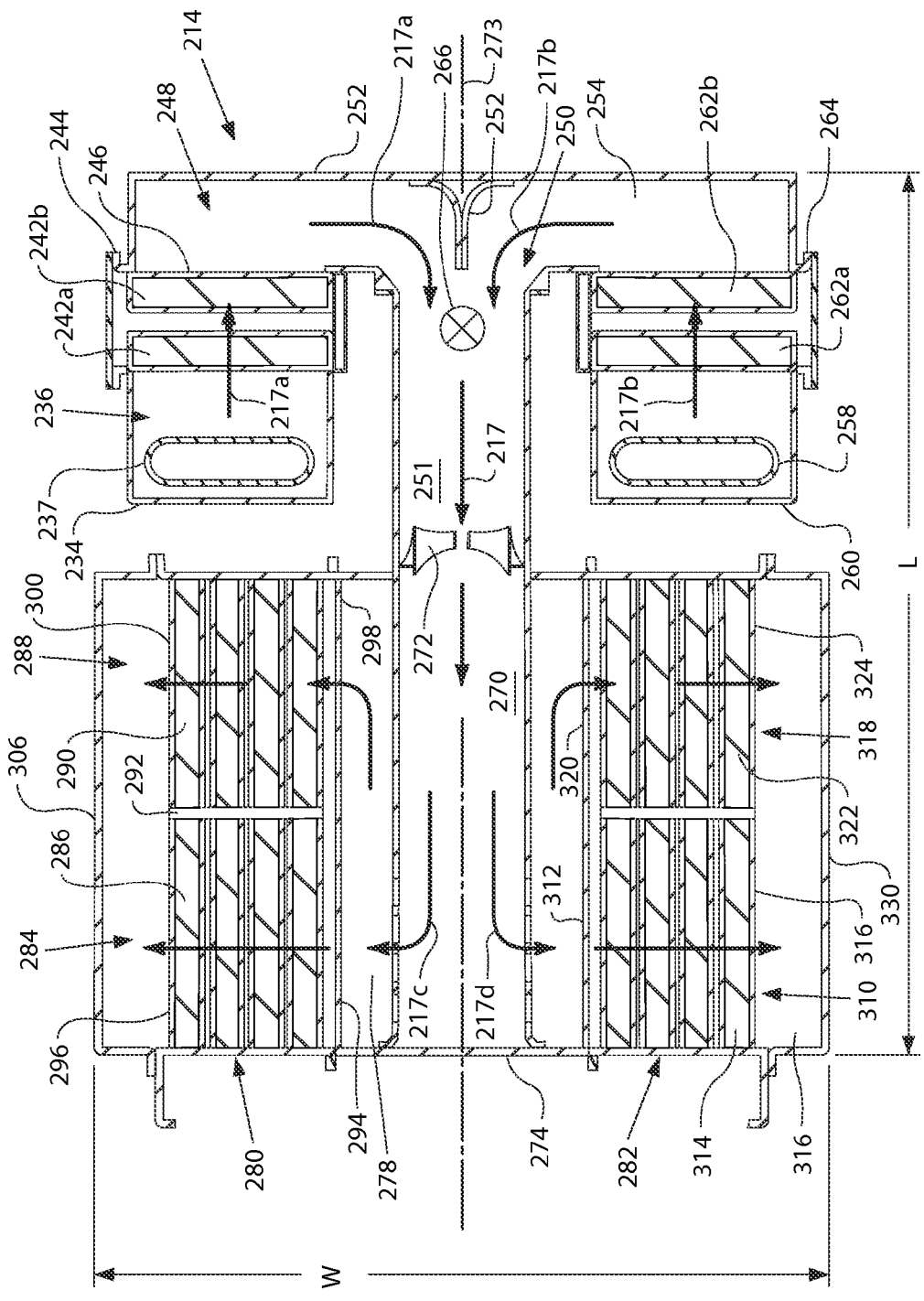
FIG. 3 is a top cross-sectional view of an embodiment of an exhaust aftertreatment system of the power system of FIG. 2.
Figure 4:
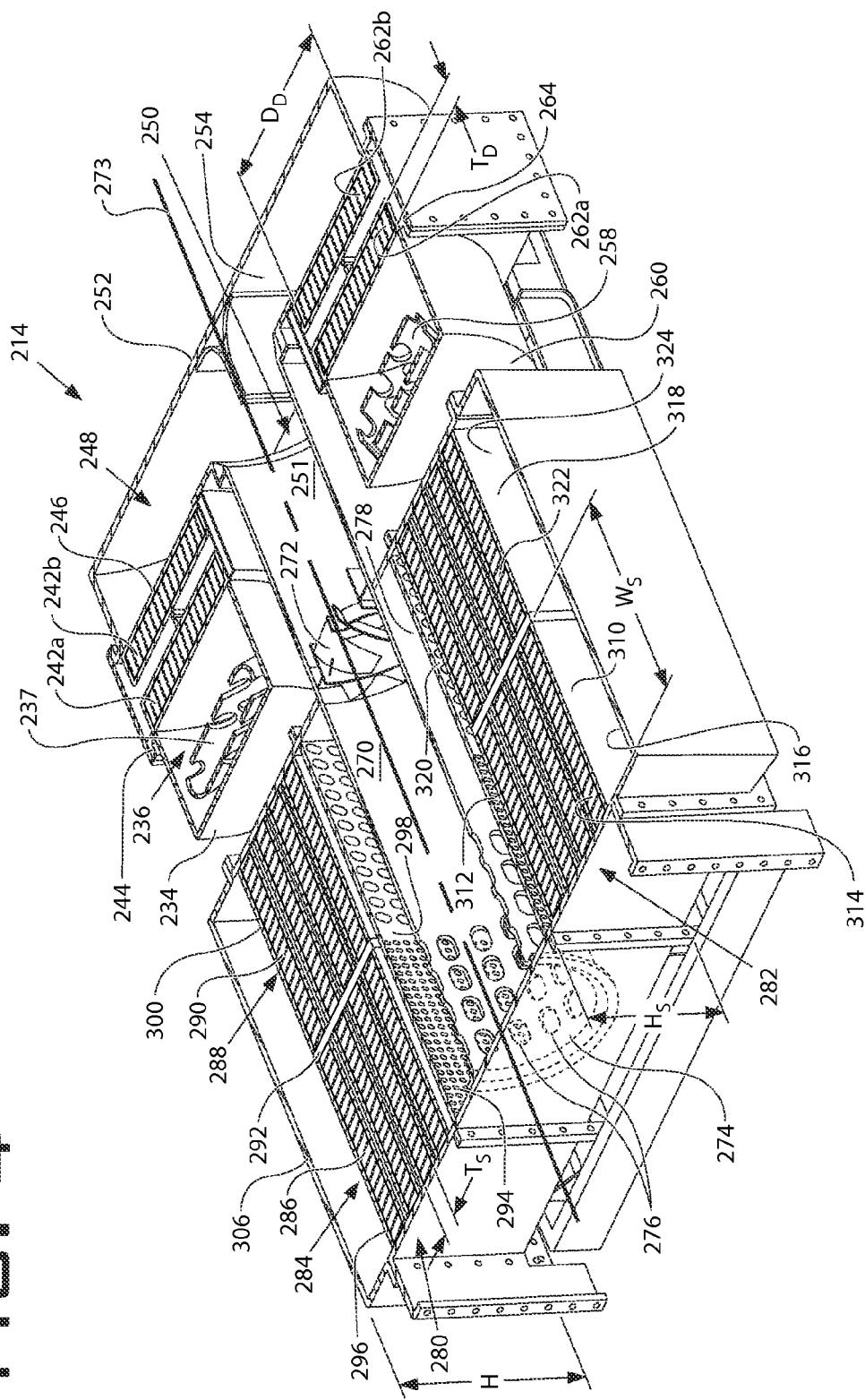
FIG. 4 is a perspective cross-sectional view the exhaust aftertreatment system of FIG. 3.

Referring to FIGS. 3 and 4, an embodiment of the exhaust aftertreatment system 214 is disclosed. The exhaust aftertreatment system 214 may be configured in a variety of shapes and sizes depending on the application. In the depicted embodiment, the exhaust aftertreatment system 214 is a generally rectangular box-shaped structure having a height dimension H (FIG. 4), a length dimension L (FIG. 3), and a width dimension W (FIG. 3). In one embodiment, the height H is less than about 94.5 cm, the length L is less than about 258 cm, and the width W is less than about 226 cm. Thus, the total volume of the system is less than about 5.5101 cubic meters. In another embodiment, the height H is approximately 89.5 cm, the length L is approximately 253 cm, and the width W is approximately 221 cm. Thus, the total volume of the system is about 5.0042 cubic meters.

Figure 5:
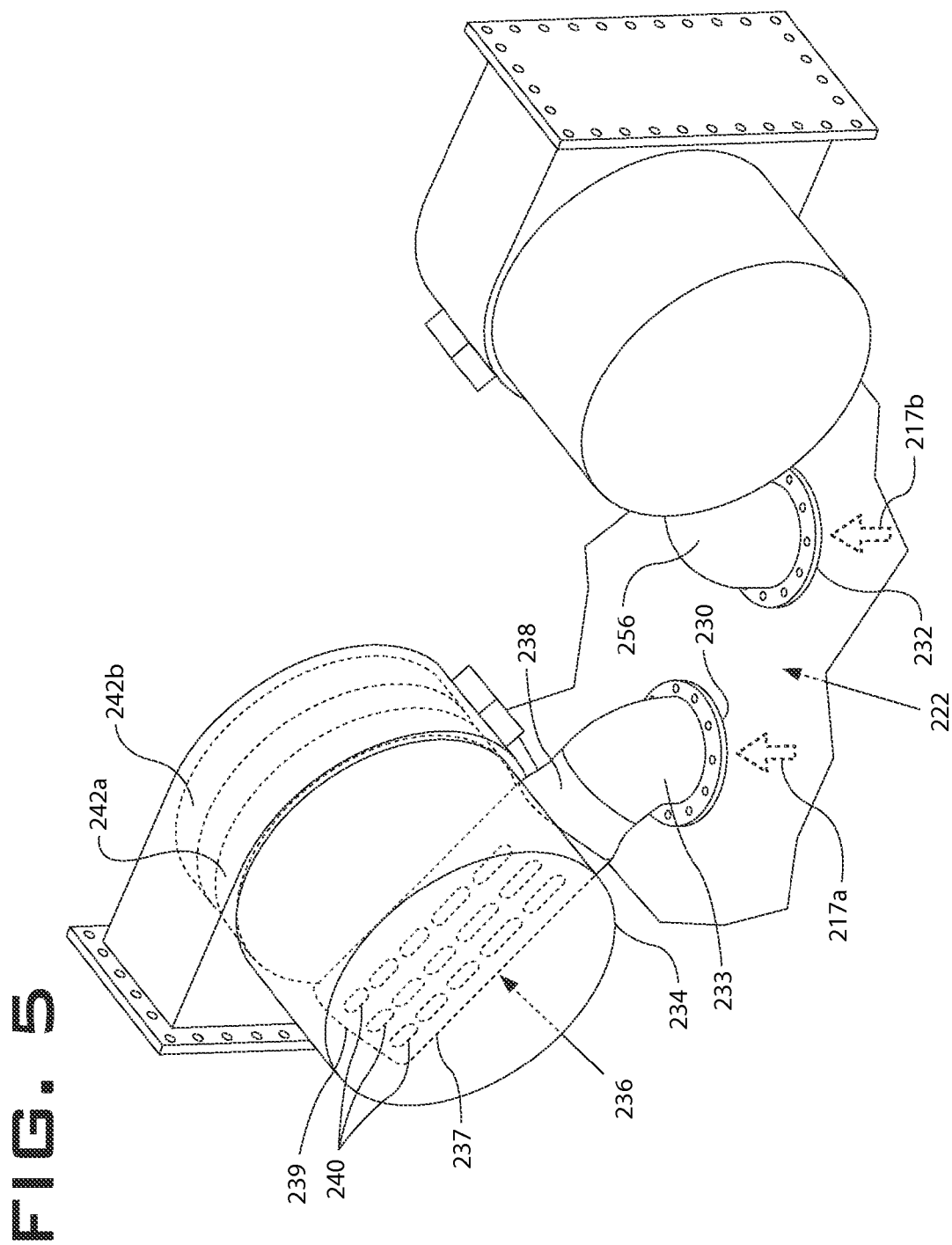
FIG. 5 is a partial sectioned perspective view of an inlet portion of the exhaust aftertreatment system of FIG. 3.

Referring to FIG. 5, the exhaust aftertreatment system 214 includes a first exhaust inlet 230 configured to receive a first entering exhaust flow 217a and a second exhaust inlet 232 configured to receive a second entering exhaust flow 217b disposed through the bottom wall 222. A first conduit 233 fluidly couples the first exhaust inlet 230 to a first DOC housing 234. The first DOC housing 234 forms a chamber 236. A first diffuser 237 is coupled to the first conduit 233 and is disposed within the chamber 236.

Figure 6:
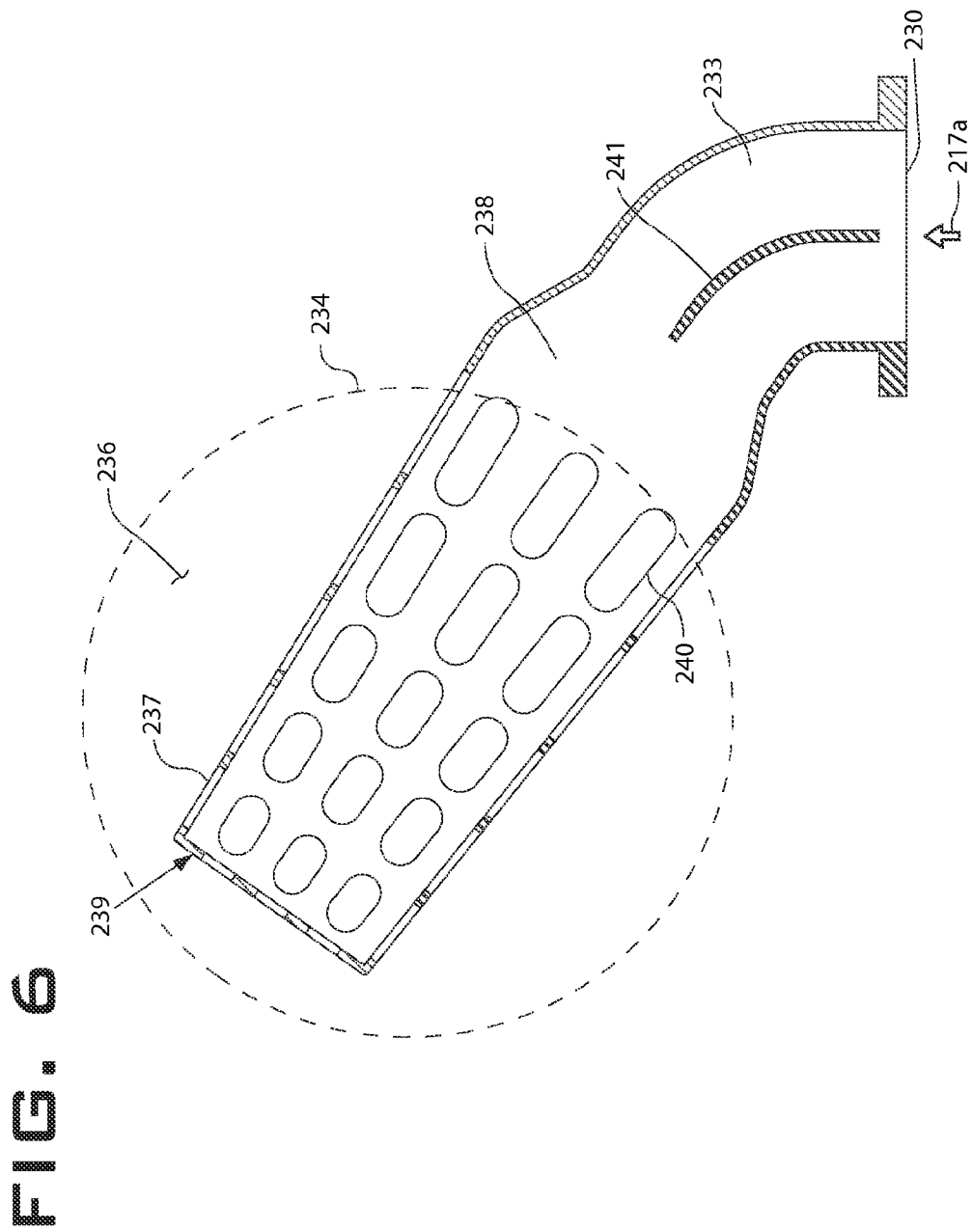
FIG. 6 is a partial sectioned end view of the inlet portion of FIG. 5.

Referring to FIG. 6, the first diffuser 237 may be configured in a variety of ways. Any structure capable of reducing the swirl of the exhaust entering the first DOC housing and spreading out the flow of the first entering exhaust stream 217a may be used. In the depicted embodiment, the first diffuser 237 is hollow with a generally circular, oval, elliptical, or rectangular cross-section. The first diffuser 237 has a first end 238 coupled to the first conduit 233 and a distal second end 239. The first diffuser 237 includes a plurality of apertures or perforations 240 configured to allow the exhaust to flow from the interior of the first diffuser 237 into the chamber 236. The first diffuser 237 may be configured to provide an increasing resistance to flow along the length of the first diffuser 237 toward the distal second end 239. For example, in the depicted embodiment, the first diffuser 237 tapers inward such that the cross-section of the hollow interior decreases in size along its length toward the distal second end 239. In other embodiments, however, the first diffuser 237 may not be tapered.

The plurality of openings or perforations 240 may also be configured to provide an increasing resistance to flow exiting the first diffuser 237 along the length toward the distal second end 239. For example, the plurality of openings or perforations 240 may decrease in number and/or each of the plurality of apertures or perforations 240 may decrease in size along the length of the first diffuser 237.

A first baffle 241 is positioned in the first exhaust inlet 232 to assist in directing the first entering exhaust stream 217a into the first diffuser 237. The first baffle 241 is configured to split the first exhaust inlet 232 into two sections. In the depicted embodiment, the first exhaust inlet 232 is curved and the first baffle 241 is positioned within the curve to promote an even flow distribution of exhaust entering the first diffuser 237.

The configuration of the first diffuser 237 and the first baffle 241 help provide an exhaust flow within the first DOC housing 234 with an even distribution and low swirl.

One or more DOC(s) are also disposed within the first DOC housing 234. The DOC(s) may be configured in a variety of ways and contain catalyst materials useful in collecting, absorbing, adsorbing, and/or converting hydrocarbons, carbon monoxide, and/or oxides of nitrogen contained in the exhaust. Such catalyst materials may include, for example, aluminum, platinum, palladium, rhodium, barium, cerium, and/or alkali metals, alkaline-earth metals, rare-earth metals, or combinations thereof. The DOC(s) may include, for example, a ceramic substrate, a metallic mesh, foam, or any other porous material known in the art, and the catalyst materials may be located on, for example, a substrate of the DOC(s). The DOC(s) assist in oxidizing one or more components of the exhaust flow, such as, for example, particulate matter, hydrocarbons, and/or carbon monoxide. The DOC(s) are also configured to oxidize NO contained in the exhaust gas, thereby converting it to NO2. Thus, the DOC(s) assist in achieving a desired ratio of NO to NO2 upstream of the SCR(s).

In the depicted embodiment, a first DOC 242a and a second DOC 242b are disposed within the first DOC housing 234 in series. The first and second DOCs 242a, 242b are generally cylindrical substrates with a diameter $D_D$ (FIG. 4) greater than about 58 cm and a thickness $T_D$ greater than about 7 cm. Thus, the volume of the each DOC is greater than about 18494.56 cubic centimeters. In another embodiment, the diameter $D_D$ is greater than about 60.9 cm and the thickness $T_D$ greater than about 8.9 cm. Thus, the volume of the each DOC is greater than about 25924.74 cubic centimeters. The characteristics of the first DOC 242a (i.e. shape, size, the type of catalyst coating, the number of cells per squire inch, etc.) may be similar to the second DOC 242b or may be different.

The first DOC housing 234 includes a first DOC support structure 244. The first DOC support structure 244 may be configured in a variety of ways. Any structure capable of supporting the DOC(s) 242a, 244b in a desired orientation and providing a seal such that exhaust directed through the catalysts does not leak or escape around the edges of the catalysts may be used.

Adjacent a first DOC housing outlet 246 is a first redirecting flow passage 248. The first redirecting flow passage 248 is configured to redirect the flow of the first entering exhaust stream 217a from the first DOC housing outlet 246 to an inlet 250 of an intermediate flow region 251 (described in detail below). One or more walls or baffles 252 are utilized to aid in redirecting the flow of exhaust.

The structure and components described above from the first exhaust inlet 230 to the first redirecting flow passage 248 are similar to the structure and components from the second exhaust inlet 232 to a second redirecting flow passage 254, including a second conduit 256, a second diffuser 258, a second DOC housing 260, a third and fourth DOCs 262a, 262b, and a second DOC support structure 264.

The first redirecting flow passage 248 and the second redirecting flow passage 254 merge the exhaust from the first exhaust inlet 230 and the second exhaust inlet 234 at the intermediate flow region inlet 250. Positioned in the proximity of the intermediate flow region inlet 250 is a reductant inlet 266 (see FIG. 3). As discussed above regarding FIG. 2, the power system 210 includes a reductant supply system 226. The reductant supply system 226 is configured to introduce reductant, such as urea for example, into the exhaust stream 217 at the reductant inlet 266. The reductant inlet 266 may be, for example, an injector or other dispensing device adapted to introduce the reductant into the exhaust.

The intermediate flow region 251 may be configured in a variety of ways. For example, the intermediate flow region 251 may be configured to allow sufficient mixing of the exhaust and the reductant prior to the mixture entering into a downstream emission control device. In the depicted embodiment, the intermediate flow region 251 includes a mixing tube 270 and a diffuser or mixing device 272. The mixing tube 270 is a generally cylindrical tube extending along a longitudinal axis 273. The mixing tube 270 has an open end defining the intermediate flow region inlet 250 and a closed end 274 distal from the intermediate flow region inlet 250. Adjacent the closed end 274 are a plurality of radially spaced openings 276 around at least a portion of the circumference of the mixing tube 270. Thus, the plurality of radially spaced openings 276 may be positioned around the entire circumference of the mixing tube 270 or around a portion of the circumference, such as for example, around the circumference except at approximately the 90 degrees position and the 270 degree position where the zero degree position is at top vertical position as oriented in FIGS. 4 and 7. The openings 276 define the exit of the mixing tube 270 and may be configured in a variety of ways (e.g. shape, size, location along the circumference of the mixing tube).

Figure 7:
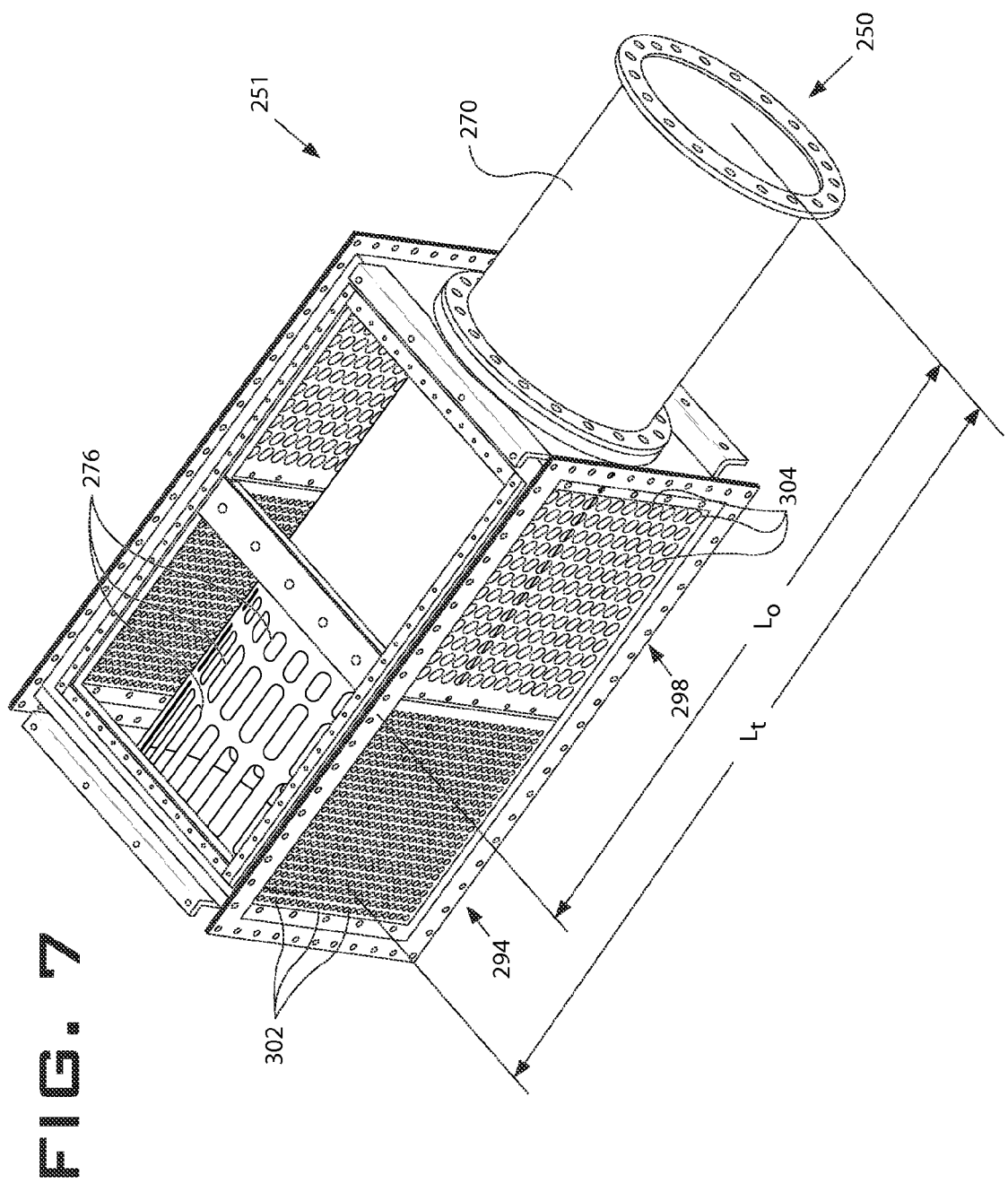
FIG. 7 is a perspective view of the intermediate flow region of the exhaust aftertreatment system of FIG. 3.

Referring to FIG. 7, the mixing tube 270 has a total length Lt (distance from the intermediate flow region inlet 250 to the closed end 274) that is about 75% or greater than the exhaust aftertreatment system length L. The mixing tube 270 may have a length to openings Lo (distance from the intermediate flow region inlet 250 to the first of the plurality of radially spaced openings 276) that is about 55% or greater than the exhaust aftertreatment system length L. In one embodiment, the total length Lt is about 80% or greater the system length L and the length to openings Lo is about 60% or greater than the system length L.

In one embodiment, the total mixing tube length Lt is greater than about 200 cm and the length to opening Lo is greater than about 149 cm. In another embodiment, the mixing tube total length Lt is about 202.5 cm and the mixing tube length to opening Lo is about 151.5 cm.

Referring to FIGS. 3-4, the diffuser or mixing device 272 may be any structure capable of disrupting the flow of the exhaust stream 217 and facilitating dispersion of reductant into the exhaust stream 217. The diffuser or mixing device 272 may include orifices, deflectors, swirlers, baffles, or other structures that disrupt flow of the exhaust stream 217. The diffuser or mixing device 272 may be positioned within the mixing tube 270 and held in place by any suitable means. The diffuser or mixing device 272 may be positioned along the mixing tube length Lt at any suitable location. In the depicted embodiment, the diffuser or mixing device 272 is positioned closer to the intermediate flow region inlet 250 than to the closed end 274.

Positioned radially outward of the mixing tube openings 276 is an SCR inlet exhaust flow region 278. In fluid communication with the SCR inlet exhaust flow region 278, and on opposites sides of the mixing tube 270, are a first SCR assembly 280 and a second SCR assembly 282. The SCR inlet exhaust flow region 278 may be common to both the first SCR assembly 280 and a second SCR assembly 282 or may be divided into separate flow areas associated with each of the SCR assemblies. The first SCR assembly 280 is similar in structure and function to the second SCR assembly 282, thus only the first SCR assembly 280 will be described in detail.

The first SCR assembly 280 includes a first SCR bank 284 that includes at least a first SCR catalyst(s) 286, a second SCR bank 288 that includes at least a second SCR catalyst(s) 290, and a SCR support structure 292 configured to support the SCR catalysts in a desired orientation. The SCR catalyst(s) 286, 290 may be configured in a variety of ways. The SCR catalyst(s) 286, 290 may be any suitable SCR catalyst, such as for example, a vanadium and titanium-type, a platinum-type, or a zeolite-type SCR catalyst, and includes a metallic or ceramic honeycomb substrate or other structure containing one or more of these metals and configured to assist in reducing NOx. The SCR catalyst(s) 286, 290 may have an optimum or peak NOx conversion rate when the ratio of NO to NO2 entering the SCR catalyst(s) 286, 290 is approximately one to one.

In the depicted embodiment, the first SCR bank 284 includes a first SCR bank inlet 294, four SCR catalysts 286 oriented in series, and a first SCR bank outlet 296. The second SCR bank 288 includes a second SCR bank inlet 298, four SCR catalysts 290 arranged in series, and a second SCR bank outlet 300. The second SCR bank 288 is arranged in parallel with the first SCR bank 284.

The SCR catalysts 286, 290 in the depicted embodiment have generally rectangular substrate (or rectangular with rounded corners) with a height $H_S$ and width $W_S$ greater than about 59 cm and a thickness $T_S$ greater than about 7 cm. Thus, each catalyst substrate has a volume greater than about 24367 cubic centimeters. In another embodiment, the SCR catalysts 286, 290 have a height $H_S$ and width $W_S$ greater than about 60.9 cm and a thickness $T_S$ greater than about 8.9 cm. Thus, each catalyst substrate has a volume greater than about 33008.4 cubic centimeters. The characteristics of the each of the SCR catalyst (i.e. shape, size, the type of catalyst coating, the number of cells per squire inch, etc.) may be similar to each other or may be different.

The first SCR bank inlet 294 is positioned generally adjacent the radially-spaced openings 276 while the second SCR bank inlet 298 is positioned axially closer to the intermediate flow region inlet 250. The first SCR bank inlet 294 is configured to resist the flow of exhaust into the first SCR bank 284 more than the second SCR bank inlet 298 resists flow of exhaust into the second SCR bank 288. This may be accomplished in a variety of ways. For example, the total orifice area of the first inlet may be smaller than the total orifice area of the second inlet. Referring to FIG. 7, in the depicted embodiment, the first SCR bank inlet 294 is defined by a first plurality of openings 302 and the second SCR bank inlet 298 is defined by a second plurality of openings 304. Each of the second plurality of openings 304 is larger than each of the first plurality of openings 302. As a result, the first plurality of openings 302 resists flow more than the second plurality of openings 304.

Referring to FIGS. 3 and 4, the first SCR bank outlet 284 and the second SCR bank outlet 288 open to a common first exhaust manifold 306 that defines a first exhaust exit passage. The first exhaust manifold 306 is configured to direct exhaust vertically upward where it exits the system from or adjacent to the top wall 220.

As indicated above, the first SCR assembly 280 is similar in structure and function to the second SCR assembly 282. Thus, the second SCR assembly 282 includes a third SCR bank 310 having a third SCR bank inlet 312, four SCR catalysts 314 oriented in series, and a third SCR bank outlet 316. The second SCR assembly 282 further includes a fourth SCR bank 318 having a fourth SCR bank inlet 320, four SCR catalysts 322 arranged in series, and a fourth SCR bank outlet 324. The third SCR bank 310 is arranged in parallel with the fourth SCR bank 318. The third SCR bank outlet 316 and the fourth SCR bank outlet 324 open to a common second exhaust manifold 330 that defines a second exhaust exit passage.

As evident from FIGS. 3 and 4, the exhaust aftertreatment system 214 may be generally symmetric about the longitudinal axis 273, though that is not required.

Industrial Applicability

The disclosed exhaust aftertreatment system 214 provides an efficient, compact, reliable way to reduce undesirable emissions released into the atmosphere. The disclosed exhaust treatment system may be used to reduce undesirable exhaust emissions from a power system 210 in a variety of applications, such as but not limited to, locomotive applications, on-highway trucks or vehicles, off-highway trucks or machines, earth moving equipment, generators, aerospace applications, marine applications, pumps, stationary equipment, or other engine powered applications. In particular, the disclosed exhaust aftertreatment system 214 is well-suited for installation on a diesel locomotive.

In particular, referring to FIGS. 2-4, the exhaust aftertreatment system 214 mounts onto the roof of the power system 210 such that the top wall 220 and one or more of the side walls 224 are external to the body 215 and exposed to atmosphere. In this mounting arrangement, the exhaust aftertreatment system 214 is isolated from the engine heat and exposed to atmosphere for improved heat rejection versus an internal mounted system.

Since first exhaust inlet 230 and the second exhaust inlet 232 are disposed on the bottom wall 222, connection to the engine is convenient with minimal length of the exhaust conduit 216 required. For convenience in describing the exhaust flow, the power system 210 is assumed to be on a horizontal surface. Exhaust flow through the exhaust aftertreatment system 214 is illustrated with arrows in FIG. 3.

The first and second entering exhaust streams 217a, 217b from the engine 212 enter the first exhaust inlet 230 and the second exhaust inlets 232, respectively, in a generally vertical direction. The first and second conduits 233, 256, and the first and second DOC housings 234, 260 are configured to redirect the entering exhaust streams 217a, 217b about 90 degrees into a horizontal flow direction and through the DOCs 242, 262. Once through the DOCs 242, 262, the redirecting flow passages 248, 254 turn the streams about 180 degrees and merge the two streams at the intermediate flow region inlet 250 generally along the longitudinal axis 273.

In the proximity of the mixing region inlet 250, the reductant supply system 226 introduces reductant into the merged exhaust stream 217, which flows down the mixing tube 270 and through the mixing device 272. The configuration of the exhaust aftertreatment system 214 provides a mixing tube length Lt that is about 75% to 80% the length L to the entire exhaust aftertreatment system 214. When urea is used as a reductant, a longer resonance time of the exhaust/reductant mixture in the mixing tube 270 helps create a homogenized dispersion of reductant in the exhaust, which helps ensure sufficient decomposition of the urea into ammonia (NH3).

Near the mixing tube closed end 274, the exhaust exits the mixing tube 270 radially through the openings 276. Thus, the openings 276 and mixing tube 270 are configured to redirect the exhaust stream 217 about 90 degrees from a generally axial flow direction to a generally radial flow direction. By configuring the mixing tube 270 to redirect the exhaust flow from axial to radial, the mixing tube length Lt can be maximized within the constraints of the housing. After exiting the mixing tube 270, the exhaust steam 217 flows into the SCR inlet exhaust flow region 278 and splits into a first exiting exhaust stream 217c and a second exiting exhaust stream 217d that flow through the first SCR assembly 280 and the second SCR assembly 282, respectively. The first exiting exhaust stream 217c is further divided into a third exhaust stream and a fourth exhaust stream that flow through the first SCR bank 284 and the second SCR bank 288, respectively. Though the first SCR bank inlet 294 and the third SCR bank inlet 312 are closer to the radial openings 276, exhaust flow through the SCR catalyst banks is balanced because the first SCR bank inlet 294 and the third SCR bank inlet 312 are configured to provide greater flow resistance than the second SCR bank inlet 288 and the fourth SCR bank inlet 320.

Since the exhaust stream 217 is redirected about 90 degrees from a generally axial flow direction to a generally radial flow direction to flow through the SCR catalyst assemblies 280, 282 when mounted onto the power system 210, the orientation of the SCR substrate face may be generally perpendicular to the travel direction of the power system 210. This provides less dynamic impact force on the SCR substrates. In addition, the parallel arrangement to the SCR catalyst banks 284, 288, 310, 318 help to minimize exhaust back pressure in the system.

Once through the SCR catalyst assemblies 280, 282, the exhaust manifolds 306, 330 redirect the exhaust about 90 degrees to a vertical direction that exits the exhaust aftertreatment system 214 from or adjacent to the top wall 220.

Freight locomotives are intended for interchange service are subject to size constraints. For example, the Association of American Railroad (AAR) Plate L diagram defines the clearance envelope for freight locomotives intended for interchange service (see AAR manual of Standards and Recommended Practices—Locomotives and Locomotive Interchange Equipment). Thus, any locomotive exhaust aftertreatment system, originally manufactured or retrofitted, must be positioned and sized to ensure that the locomotive remains within the required clearance envelope.

The disclosed exhaust aftertreatment system 214 may be sized such that it can be mounted onto the roof of a locomotive without resulting in the locomotive exceeding the AAR Plate L clearance envelope. Furthermore, the system, while roof-mounted, has the capability of reducing exhaust emissions below current anticipated EPA Tier 4 emissions regulations for NOx (i.e. 1.3 g/bhp-hr) while keeping exhaust backpressure below about 8.5 kPa when the locomotive is running at rated power (i.e. notch 8). In other embodiments, the exhaust backpressure is kept below about 7.9 kPa when the locomotive is running at rated power (i.e. notch 8).

Thus, the disclosed exhaust aftertreatment system may include a total DOC substrate volume greater than about 73,980 cubic centimeters, a total SCR catalyst substrate volume greater than about 389,875 cubic centimeters, a mixing tube total length of about 75% or greater than the total length of the exhaust aftertreatment system, enclosed in a housing with a the height less than about 94.5 cm, a length L less than about 258 cm, and a width W less than about 226 cm. The system being configured to keep exhaust backpressure below about 8.5 kPa when the locomotive is running at rated power (i.e. notch 8).

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. An aftertreatment system for treating an exhaust from an engine, comprising:
   a first exhaust flow region;
   a first bank of one or more exhaust treatment, the first bank having a first inlet in fluid communication with the first exhaust flow region; and
   a second bank of one or more exhaust treatment devices having a second inlet in fluid communication with the exhaust flow region; the first bank arranged in parallel with the second bank;
   wherein the first inlet is configured to provide greater flow resistance to the exhaust than the second inlet; and
   a housing exclusive of the engine containing the first exhaust flow region, the first bank of one or more exhaust treatment devices and the second bank of one or more exhaust treatment devices.

2. The exhaust treatment system of claim 1 wherein the first inlet has a first group of openings and the second inlet has a second group of openings, wherein the first group of openings has a smaller total flow area than the second group of openings.

3. The exhaust treatment system of claim 1 further comprising a second exhaust flow region in fluid communication with and upstream from the first exhaust flow region, the second exhaust flow region extending along a longitudinal axis, wherein the system is configured to flow exhaust through the first bank of one or more exhaust treatment devices in a direction substantially perpendicular to the longitudinal axis.

4. The exhaust treatment system of claim 3 wherein the second exhaust flow region is configured to direct exhaust into the first exhaust flow a region in a radial direction.

5. The exhaust treatment system of claim 3 wherein the second exhaust flow region includes a flow passage having an open end defining an inlet, a closed end opposite the open end, and a plurality of radial openings adjacent the closed end defining an outlet.

6. The exhaust treatment system of claim 1 comprising an exhaust inlet passage upstream of second exhaust flow region, the exhaust inlet passage being coupled to a diffuser having a plurality of apertures.

7. The exhaust treatment system of claim 6 comprising baffle within the exhaust inlet passage upstream of diffuser, the baffle being configured to divide the exhaust stream entering the diffuser.

8. The exhaust treatment system of claim 6 wherein the plurality of apertures decrease in size toward a distal end of the diffuser.

9. The exhaust treatment system of claim 6 wherein the diffuser tapers inward toward a distal end of the diffuser.

10. The exhaust treatment system of claim 6 wherein the diffuser is positioned upstream of a diesel oxidation catalyst.

11. A power source, comprising:
an engine;
an exhaust conduit configured to receive exhaust from the engine;
an exhaust treatment system in fluid communication with the exhaust conduit, the exhaust treatment system comprising:
a first exhaust flow region;
a first bank of one or more exhaust treatment devices in fluid communication with the exhaust flow area, the first bank having a first inlet configured to receive exhaust directly from the first exhaust flow region;
a second bank of one or more exhaust treatment devices in fluid communication with the exhaust flow area; the first bank arranged in parallel with the second bank, the second bank having a second inlet configured to receive exhaust directly from the first exhaust flow region, wherein the first inlet is configured to provide greater flow resistance to the exhaust than the second inlet; and
a housing exclusive of the engine containing the first exhaust flow region, the first bank of one or more exhaust treatment devices and the second bank of one or more exhaust treatment devices.

12. The power source of claim 11 wherein the first inlet has a first group of openings and the second inlet has a second group of openings, wherein the first group of openings has a smaller total flow area than the second group of openings.

13. The power source of claim 11 comprising a second exhaust flow region in fluid communication with and upstream from the first exhaust flow region, the second exhaust flow region extending along a longitudinal axis, wherein the system is configured to flow exhaust through the first bank of one or more exhaust treatment devices in a direction substantially perpendicular to the longitudinal axis.

14. The exhaust treatment system of claim 13 wherein the second exhaust flow region includes a flow passage having an open end defining an inlet, a closed end opposite the open end, and a plurality of radial openings adjacent the closed end defining an outlet.

15. The exhaust treatment system of claim 13 comprising an exhaust inlet passage upstream of second exhaust flow region, the exhaust inlet passage being coupled to a diffuser.

16. The exhaust treatment system of claim 15 comprising baffle within the exhaust inlet passage upstream of diffuser, the baffle being configured to divide the exhaust stream entering the diffuser.

17. The exhaust treatment system of claim 8 wherein the diffuser is hollow and includes a plurality of apertures that decrease in size toward a distal end of the diffuser.

* * * * *